March 21, 1933. O. E. EGGEN 1,902,626
DEVICE FOR SYNCHRONIZING THE SPEED OF A VEHICLE
WITH THE STEERING MECHANISM THEREOF
Filed July 6, 1931 2 Sheets-Sheet 1
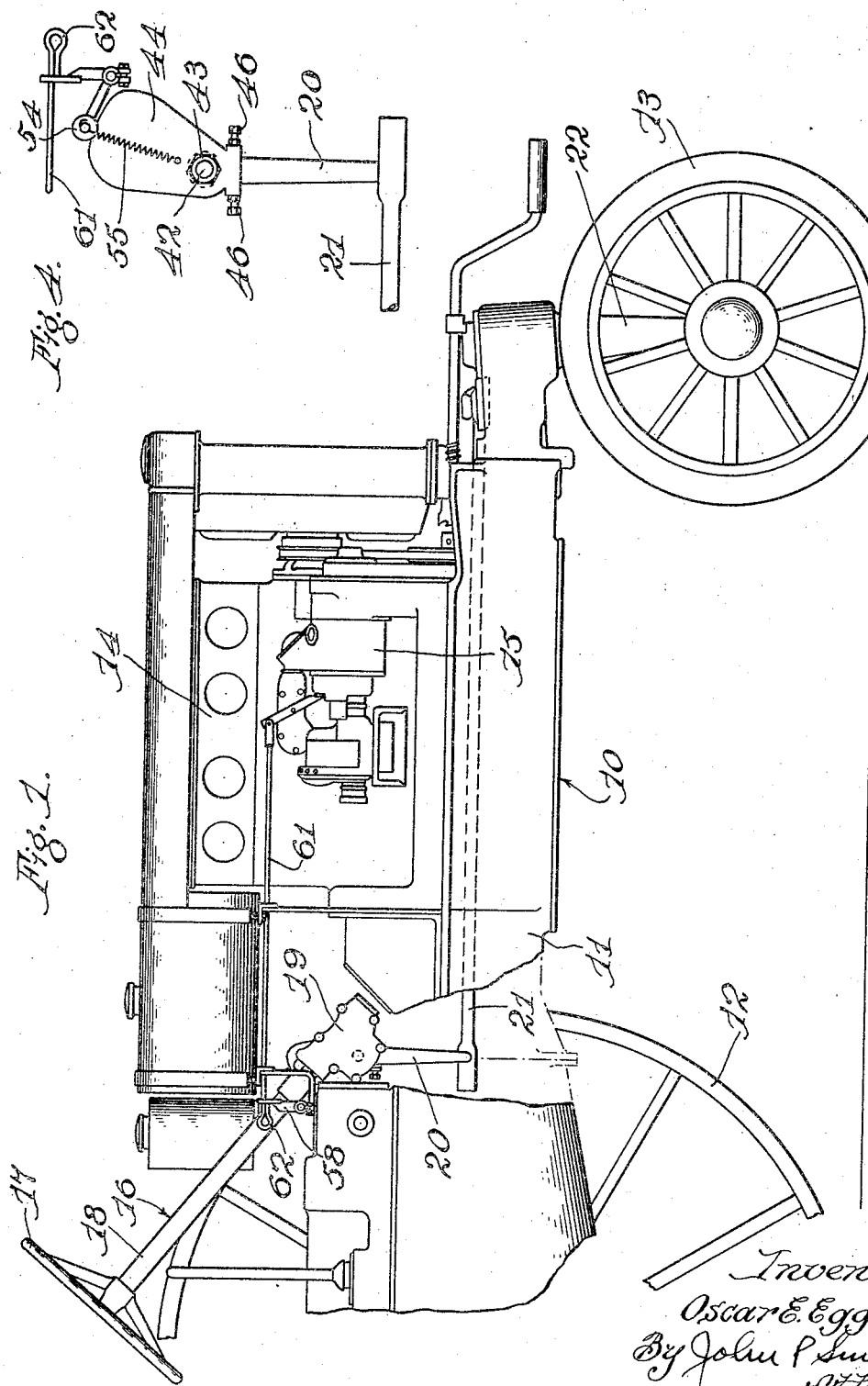
Inventor.
Oscar E. Eggen.
By John P Smith
Atty.

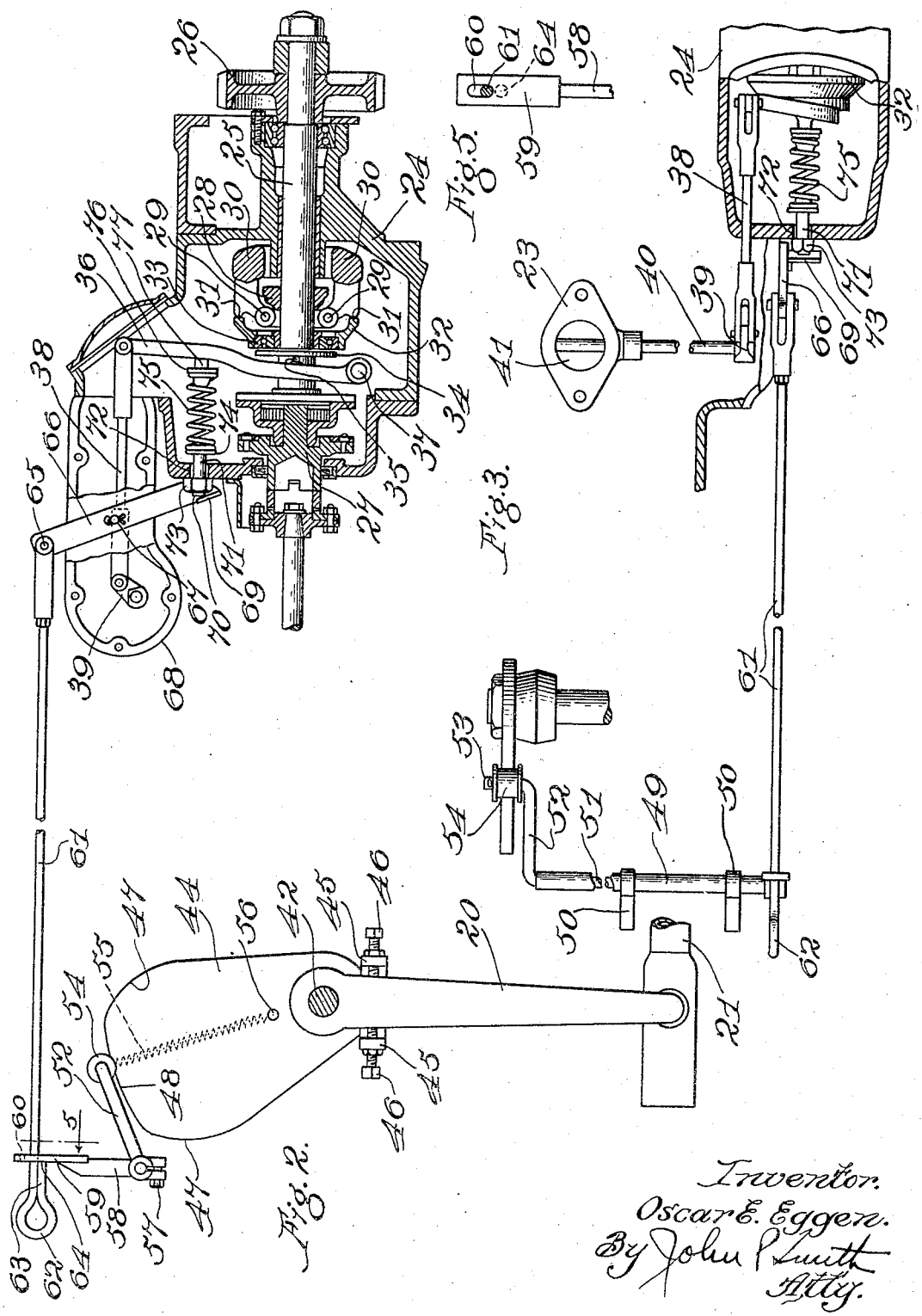

Patented Mar. 21, 1933

1,902,626

UNITED STATES PATENT OFFICE

OSCAR E. EGGEN, OF CHARLES CITY, IOWA, ASSIGNOR TO OLIVER FARM EQUIPMENT COMPANY, A CORPORATION OF DELAWARE

DEVICE FOR SYNCHRONIZING THE SPEED OF A VEHICLE WITH THE STEERING MECHANISM THEREOF

Application filed July 6, 1931. Serial No. 548,754.

The present invention is directed generally to motor propelled vehicles and more particularly to a device for synchronizing the speed of the vehicle with the steering or turning of the same, so as to maintain or control the speed of the vehicle at a uniform rate when making the turn in either direction.

Heretofore, motor propelled vehicles and more particularly, those of the type known as tractors, which are used for drawing implements or implement attachments, increase their speed when turning at the end of a field because the traction wheel on the inside of the turn remains substantially stationary while the traction wheel on the outside of the turn increases its speed substantially two-fold, due to the differential mechanism of the tractor construction. This is especially true of the agricultural type of tractor in which means are sometimes provided for synchronizing the steering mechanism with the braking mechanism of each individual traction wheel. In tractors of this last construction, the traction wheel on the inside of the turn usually forms the pivot for the tractor and the outside traction wheel describes a circle about the inner traction wheel as a center. This obviously increases the speed of the outside traction wheel to twice normal speed or travel of the tractor across the field, resulting not only in an excessive strain on the implement being drawn by the tractor, but also on the draw bar and frame structure of the tractor and sometimes resulting in a breaking or damaging of the implement or the tractor frame.

It is therefore one of the primary objects of the present invention to provide a novel and improved device which will automatically synchronize the speed of the tractor with the steering mechanism so that the tractor will travel at a uniform speed around the turn and thereby eliminate any undue strain on the tractor frame structure or the implement drawn by or attached to the tractor.

A further object of the invention is to provide a novel and improved device which will synchronize the speed of the tractor with the steering mechanism by operatively connecting the steering mechanism with the governor and throttle valve of the tractor so as to not only insure a uniform speed of the tractor, but to also maintain sufficient power to effect an efficient and uniform operation of the tractor when making the turn.

These and other objects are accomplished by providing a construction and an arrangement of the various parts in the manner hereinafter described and particularly pointed out in the appended claims.

Referring to the drawings:

Fig. 1 is a fragmentary side elevational view of a conventional form of tractor having portions thereof broken away showing the manner in which my improved device of synchronizing the speed of the tractor with the steering mechanism;

Fig. 2 is an enlarged fragmentary cross-sectional and diagrammatic view showing the manner in which the steering mechanism is operatively connected to the governor;

Fig. 3 is a top plan view of the parts shown in Fig. 4;

Fig. 4 is a detailed view of the camming mechanism attached to the steering arm; and Fig. 5 is a cross sectional view taken on a line 5—5 in Fig. 2.

In illustrating one form of my invention, I have shown the same in connection with a conventional form of tractor generally indicated by the reference character 10 which includes, a main frame 11, rear traction wheels 12, front steering wheel or wheels 13, an internal combustion engine generally indicated by the reference character 14, an engine governor mechanism generally indicated by the reference character 15 and a steering mechanism generally indicated by the reference character 16. The steering mechanism here shown comprises the usual steering wheel 17 journaled in a post 18 which in turn is secured to a steering bracket 19. The steering wheel 17 is operatively connected with the usual mechanism for operating steering arm 20. The lower or free end of the arm 20 is connected by means of the usual steering rod connections 21 to the vertically extending steering standard or support 22 in any well known manner. Journaled on the opposite sides of the vertical support 22 is the usual front steering wheels 13.

Secured to one side of the tractor, opposite to the side on which the governor 15 is positioned, is a carburetor generally indicated by the reference character 23 and diagrammatically shown in Fig. 3 of the drawings. The governor here shown and indicated generally by the reference character 15, is a conventional type of governor and comprises a governor's casing 24 which is secured to the side of the engine 14 in any well known manner. Journaled in suitable bearings in the casing 24 is a governor shaft 25 which is provided with a gear 26 which in turn is adapted to mesh with suitable gears and be operatively driven by the crank shaft of the motor in a manner well understood in the art. The other end of the governor shaft is connected in the usual manner to an impulse coupling, generally indicated by the reference character 27. Secured to the shaft 25 in any well known manner is a collar 28 which has pivotally secured on the opposite sides thereof, as shown at 29, governor weights 30. These governor weights are provided with laterally projecting camming portions 31 which in turn are adapted to engage a dish-shaped sleeve or collar 32 which in turn is supported on an anti-friction bearing generally indicated by the reference character 33. A portion of this anti-friction bearing 33 bears laterally against a flanged washer 34 loosely mounted on the shaft 25. The rear face of the washer 34 is adapted to engage projections 35 formed on the opposite sides of a governor lever 36. The lower end of the lever 36 is pivoted on a pin 37 secured to the housing 24 of the governor. The upper or free end of the lever 36 is connected by means of an adjustable connection 38 to a crank arm 39. The crank arm 39 is secured to a shaft 40 and extends across the motor 14 to the other side of the carburetor and operatively connects the fly valve 41 of the carburetor 23 to the governor, in a manner well understood in the art. The mechanism thus far described is a conventional form of governor mechanism used in connection with tractor constructions which regulate or control the throttle valve of the carburetor in accordance with the speed of the motor so as to synchronize the speed of the motor in conformity with the conditions under which the tractor is operated.

The important feature of the present invention has to do with an improved device which is adapted to synchronize the speed of the tractor with the steering mechanism so that at the end of the field when the tractor is turned, the speed at the turn will be uniformly controlled so as to prevent any unusual strain on the tractor frame or implement drawn by or attached to the tractor.

The manner in which this device operatively connects the steering mechanism with the throttle valve and governor of the tractor will next be described.

Secured to the steering arm 20 through the medium of the steering stud 42 and nut 43 is the cam member 44. The lower end of the cam member 44 is provided with oppositely disposed and laterally extending ears as shown at 45 which have mounted in threaded engagement therewith, set screws 46, the inner ends of which are adapted to contact the opposite sides of the steering arm 20 for adjustably securing the cam 44 in its proper position with respect to the steering arm. The upper or free end portion of the cam 44 is rounded as shown at 47, while an intermediate portion as shown at 48 is circular and is arranged concentric with the axis of the stud 42 of the steering arm 20. Journaled in a bearing sleeve 49 which in turn is secured to the rear tractor frame by means of brackets 50 is a crank shaft 51. One end of the shaft 51 is provided with a right angularly bent portion so as to form a crank 52, the free end of which is bent parallel to the main bearing portion 51 as shown at 53 and has journaled thereon, a grooved roller 54. The roller 54 is adapted to contact with and ride on the curved portions 47 and 48 of the cam 44. The roller 54 is held in contact with the periphery of the cam 44 by means of an extension spring 55 which has the upper end thereof connected to the outer end portion 53 of the crank shaft 51 and the other end thereof connected by means of a pin 56 to the inner end of the camming member 44. Secured to the other end of the crank shaft 51 by means of a clamping bolt 57 is a vertically extending arm or lever 58 to the free end of which is secured, a transversely extending flat member 59. This flat member 59 is provided with a vertical slot as shown at 60 in which is adjustably mounted a connecting rod 61. The rear end of the rod 61 is folded so as to form an eye as shown at 62 with the end thereof folded back against the main body of the connection as shown at 63 so as to form in effect a stop 64 against the rear surface of the member 59 as clearly shown in Fig. 2 of the drawings. The forward end of the connecting rod 61 is pivotally connected as shown at 65, to a lever 66, which in turn, is pivoted on a hinge 67 secured to the housing 68. The housing 68 covers the connection 38, connecting the governor lever 36 to the fly valve or throttle of the carburetor. The lower end of the lever 66 has a right angularly bent portion, as shown at 69, 70 of the reciprocable pin 71. The reciprocable pin 71 is loosely mounted in an aperture 72 formed in the housing 24 of the governor. The rearward end of the reciprocable pin 71 is threaded and has mounted thereon, a nut 73. The forward end of the pin 71 is seated in a cup shaped washer 74 which in turn is seated in the rear end coils of a spring 75. The forward end of the spring 75 is provided with a second cup-shaped washer member 76, which in turn is seated on a rearwardly projecting stud 77 formed integrally with and adjacent the upper end of the governor lever 36.

The operation of my improved device for synchronizing the speed of the tractor with the steering mechanism so as to control or regulate the speed of the tractor when making a turn at the end of a field, is as follows:

Let us assume that the tractor is in operation travelling across the field at the rate of three miles per hour, with the governor and other parts thereof operating under normal conditions. When the operator or tractor reaches the end of the field a turn of the steering mechanism is made to the right or to the left in which event the inside traction wheel may form the pivot and remain substantially stationary while the outside traction wheel increases its speed to six miles per hour, by reason of differential mechanism. Of course, it will be understood that various size circles may be described depending on the extent to which the front steering wheels of the tractor are turned and the effectiveness of the braking mechanism if one is embodied in the tractor. The mechanism herein described for controlling the speed of the tractor is preferably constructed so that when the front steering wheel is turned to the right or to the left in excess of thirty degree angles, the mechanism for connecting the steering mechanism to the throttle valve governor of the tractor becomes effective to reduce the speed of the tractor, in accordance with the angle of turn. In other words, when a short turn is made by the tractor, that is where one of the rear traction wheels becomes the pivot, the synchronized mechanism becomes increasingly effective from the time the front wheels are turned at an angle of thirty degrees from the longitudinal line of the center of the tractor until the front steering wheels assume a position in which they are tangent to a line extending from the pivot wheel to the front steering wheels. Obviously the steering arm 20 is swung forwardly or rearwardly for effecting a right or left hand turn of the tractor, and when the front steering wheels have reached a thirty degree angle with respect to a longitudinal line passing through the center of the tractor, the cam member 44 will be moved simultaneously therewith until the roller 54 rides downwardly over one of the curved camming surfaces 47 of the camming member 44. This movement permits the arm 52 to swing downwardly and the arm 58 and member 59 to swing forwardly with the connection 61, which in turn permits the lower end of the lever 66 to move rearwardly. This rearward movement of the lower end of the lever 66 withdraws the offset portion 69 of the lever so that the tension of the spring 75 of the governor is reduced by having the reciprocating pin 71 move rearwardly. The reduction of the tension on the governor spring 75 permits the governor weights 30 to actuate the lever 36 rearwardly and through the connection of this lever with the connecting rod 38 to the throttle valve reduces the speed of the motor, thereby permitting the speed or control of the motor to be synchronized with the steering mechanism. It will be noted that the nut 73 is mounted in threaded engagement with the reciprocating pin 71 so that the nut may be adjusted thereon for regulating the tension on the governor spring 75. This nut 73 also forms the stop against the housing 24 of the governor and when in contact therewith forms the normal operating tension of the spring for the governor. In Fig. 4 the synchronizing mechanism is shown in the position it assumes when the tractor is travelling in a straight direction parallel to the longitudinal axis of the tractor.

From the above description, it will be readily understood that I have provided a simple, compact and efficient operating device in which the control or speed of the tractor may be regulated so as to reduce the speed of the tractor when making a turn or turns at the end of a field so as not to place an excessive strain on the tractor frame structure or the implements or attachments carried thereby.

While in the above description I have described one embodiment which my invention may assume in practice, it will of course be understood that the same is capable of modification and that modification may be made without departing from the spirit and scope of the invention as expressed in the following claims.

What I claim is my invention and desire to secure by Letters Patent is:

1. The combination with a motor vehicle, of an internal combustion engine for propelling said vehicle, traction elements operatively driven by said engine, steering means for steering said vehicle, a governor for controlling the speed of said engine, and means for synchronizing said steering means with said governor for controlling the speed of said vehicle when making a turn.

2. The combination with a tractor having an internal combustion engine mounted thereon, of a carburetor for supplying fuel to said engine, a governor for said engine, traction means for said tractor operatively driven by said engine, steering means for said tractor, and means for synchronizing said steering means with said carburetor through said governor for controlling the speed of said tractor when making a turn.

3. The combination with a tractor having an internal combustion engine mounted thereon, a carburetor for supplying fuel to said engine, a governor operatively connected to said engine for controlling said carburetor, traction means driven by said engine, steering means for said tractor, and means for synchronizing said steering means with said governor and carburetor for controlling the speed of said tractor when making a turn.

4. The combination with a tractor, of an internal combustion engine mounted thereon, traction elements for said tractor and operatively driven by said engine, steering means for said tractor, a carburetor for supplying fuel to said engine, a governor for controlling said carburetor and means for operatively connecting said steering means with said carburetor through said governor for reducing the speed of said engine in proportion to the angle of turn of said steering means.

5. The combination with a tractor having an internal combustion motor mounted thereon, of traction wheels located at one end of said tractor and operatively driven by said motor, steering wheels located at the other end of said tractor, a carburetor for supplying fuel to said motor, a governor operatively connected to said motor for controlling said carburetor, and a connection between the steering means and said governor for maintaining a uniform speed of the tractor when making a turn.

6. The combination with a tractor having an internal combustion engine mounted thereon, traction elements located at one end of said tractor and operatively driven by said engine, steering means located at the other end of said tractor, said steering means including front steering wheels and a movable steering arm operatively connected together, a carburetor for supplying fuel to said engine, a governor operatively driven by said engine and connected to said carburetor for controlling the supply of fuel to said engine, and a connection between said steering arm and said governor for maintaining a constant speed of the tractor when making a turn.

7. The combination with a tractor having an internal combustion engine mounted thereon, traction elements located at one end of said tractor and operatively driven by said engine, steering means located at the other end of said tractor, said steering means including front steering wheels and a movable steering arm operatively connected together, a carburetor for supplying fuel to said engine, a governor operatively driven by said engine and connected to said carburetor for controlling the supply of fuel to said engine, a cam mounted on said steering arm, and operative connections between said cam and said governor for reducing the speed of said motor and maintaining a constant speed of the tractor when making a turn.

8. The combination with a tractor, of an internal combustion motor mounted thereon, rear traction wheels for said tractor operatively driven by said motor, front steering wheels for said tractor, steering mechanism including a steering wheel and steering arm operatively connected with said front steering wheels, a carburetor for supplying fuel to said motor, a governor operatively connected to said motor and connected to said carburetor for controlling the supply of fuel to said motor, said governor including governor lever and operative connections between said governor and said carburetor, a spring mounted in said governor for exerting a pressure on said lever, and means operatively connecting said steering arm with said spring for varying the tension thereon and controlling the speed of said tractor in making a turn.

9. The combination with a tractor, of an internal combustion engine mounted on said tractor, traction elements driven by said engine, steering mechanism for steering the tractor including a manually operable hand wheel, steering arm, a carburetor mounted on said tractor for supplying fuel to said engine, a governor mounted on said tractor and operatively connected to said engine and said carburetor for controlling the supply of fuel to said engine, said governor including a spring and operating lever forming part of the operative connection between said carburetor and governor, a cam secured to said steering arm and operative connections between said cam and the spring of said governor for synchronizing the steering mechanism with the speed of said motor whereby the speed of said tractor is uniformly maintained when making a turn.

In testimony whereof I have signed my name to this specification, on this 2nd day of July A. D. 1931.

OSCAR E. EGGEN.